United States Patent
Yu et al.

(10) Patent No.: US 7,018,088 B2
(45) Date of Patent: Mar. 28, 2006

(54) LIGHT GUIDE PLATE FOR LIQUID CRYSTAL DISPLAY

(75) Inventors: Tai-Cheng Yu, Tu-chen (TW); Charles Leu, Fremont, CA (US); Ga-Lane Chen, Fremont, CA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 162 days.

(21) Appl. No.: 10/639,000

(22) Filed: Aug. 11, 2003

(65) Prior Publication Data

US 2004/0090765 A1    May 13, 2004

(30) Foreign Application Priority Data

Nov. 8, 2002    (TW) .............................. 91217915 U

(51) Int. Cl.
*F21V 7/05*    (2006.01)
*F21V 8/00*    (2006.01)

(52) U.S. Cl. ...................... 362/620; 362/606; 362/627; 362/628

(58) Field of Classification Search ................ 362/31, 362/561, 619, 620, 606, 627, 628; 349/62–65
See application file for complete search history.

(56) References Cited

U.S. PATENT DOCUMENTS

| | | | |
|---|---|---|---|
| 3,131,496 A * | 5/1964 | Schropp ...................... 362/31 |
| 5,029,045 A * | 7/1991 | Sanai et al. .................... 349/65 |
| 5,128,842 A * | 7/1992 | Kenmochi .................... 362/31 |
| 5,377,084 A | 12/1994 | Kojima et al. |
| 5,414,599 A * | 5/1995 | Kaneko et al. ............... 362/31 |
| 5,572,411 A * | 11/1996 | Watai et al. ................. 362/620 |
| 5,579,134 A * | 11/1996 | Lengyel ....................... 349/62 |
| 5,703,667 A | 12/1997 | Ochiai |
| 5,719,649 A * | 2/1998 | Shono et al. ................. 349/65 |
| 5,914,760 A * | 6/1999 | Daiku .......................... 349/65 |
| 5,971,558 A * | 10/1999 | Peel ............................ 362/31 |
| 6,123,431 A | 9/2000 | Teragaki et al. |
| 6,196,691 B1 | 3/2001 | Ochiai |

* cited by examiner

*Primary Examiner*—Alan Cariaso
(74) *Attorney, Agent, or Firm*—Wei Te Chung

(57) ABSTRACT

A light guide plate (3) includes a parallelepiped block. The block includes an input surface (31) for receiving light beams irradiated from a light source; two side surfaces perpendicularly adjoining the incident surface; an output surface (32) perpendicularly adjoining the incident surface and the side surfaces; and a bottom surface (33) opposing to the output surface. An array of prisms (34) is integrally formed on the output surface. Each prism is shaped as a square pyramid. All the prisms have a same size and are arranged contiguously with each other. Alternatively, the light guide plate may be a wedge-shaped block (3'). A rectangular array of prisms (34') is integrally formed on an output surface (32') thereof. Each prism is shaped as a square pyramid. The prisms are arranged contiguously with each other, and sizes of the prisms gradually decrease from a thick end to a thin end of the block.

14 Claims, 3 Drawing Sheets

LIGHT GUIDE PLATE FOR LIQUID CRYSTAL DISPLAY

BACKGROUND OF THE INVENTION

1. Field of the Invention

The present invention relates to a light guide plate for use in a liquid crystal display; and more particularly to an improved light guide plate having enhanced light diffusion on a light output surface thereof, for use in a backlight system or a front light system of a liquid crystal display. This application relates to a contemporaneously filed application having the same title, the same applicants and the same assignee with the instant application.

2. Description of Prior Art

Liquid crystal materials cannot intrinsically emit light. Rather, a liquid crystal display must be equipped with an external light source. The so-called external light source is namely a backlight system or a front light system, which is used in conjunction with the liquid crystal display. A typical backlight or a front light system comprises a light guide plate for converting a point light source or a linear light source into a planar light source.

FIG. 5 shows a conventional back light system 1 for a liquid crystal display. The back light system 1 includes a linear light source 11, a cover 111 arranged around the linear light source 11, a light guide plate 12, a reflector 13, a diffuser 14, and two pieces of prism sheets 15. The light guide plate 12 is for re-directing light beams in order to achieve efficiency of light utilization and uniformity in luminance. However, the back light system 1 employing the light guide plate 12 must also employ a number of additional complementary elements such as the diffuser 14 and the prism sheets 15. This results in high manufacturing costs and unduly complicated assembly procedures.

FIG. 6 illustrates a light guide plate 2 as disclosed in Japan laid-open patent publication no. 07-020466. The light guide plate 2 has a wedge-shaped structure; and comprises an input surface 21, an output surface 22, and a bottom surface 23 opposite to the output surface 22. An array of prisms 24 is formed on the output surface 22. A distribution density of the prisms 24 gradually decreases with an increasing distance away from a light source (not shown). However, an additional lens sheet still needs to be employed in order to improve the light utilization and uniformity in luminance of the outgoing light from the output surface 22. Therefore, the light guide plate 2 has limited efficacy in decreasing the number of elements in the overall system.

SUMMARY OF THE INVENTION

Accordingly, an object of the present invention is to provide a light guide plate which is simple, has low manufacturing costs, and has a light emitting surface which provides excellent light utilization and uniformity in luminance.

In order to achieve the object set out above, a light guide plate in accordance with a preferred embodiment of the present invention includes a parallelepiped block. The parallelepiped block includes an input surface for receiving light beams from a light source; two side surfaces perpendicularly adjoining the incident surface; an output surface perpendicularly adjoining the incident surface and the side surfaces; and a bottom surface opposing to the output surface; wherein a rectangular array of pyramidal prisms is integrally and contiguously formed on the output surface.

A light guide plate of an alternative embodiment of the present invention includes a wedge-shaped block. The wedge-shaped block has an input surface located at a thick end of the block, for receiving light beams from a light source; two side surfaces extending from the thick end to a thin end of the block; an output surface perpendicularly adjoining the incident surface and the side surfaces; and a bottom surface obliquely adjoining the input surface, opposing to the output surface; wherein a rectangular array of prisms is integrally formed on the output surface. Each prism is shaped as a square pyramid. The prisms are arranged contiguously with each other, and sizes of the prisms gradually decrease from the thick end to the thin end of the block.

These and other features, aspects and advantages of the present invention will become more apparent from the following detailed description and claims, and from the accompanying drawings in which:

DETAILED DESCRIPTION OF THE PRESENT INVENTION

Reference will now be made to the drawings to describe the present invention in detail.

Figure 1:
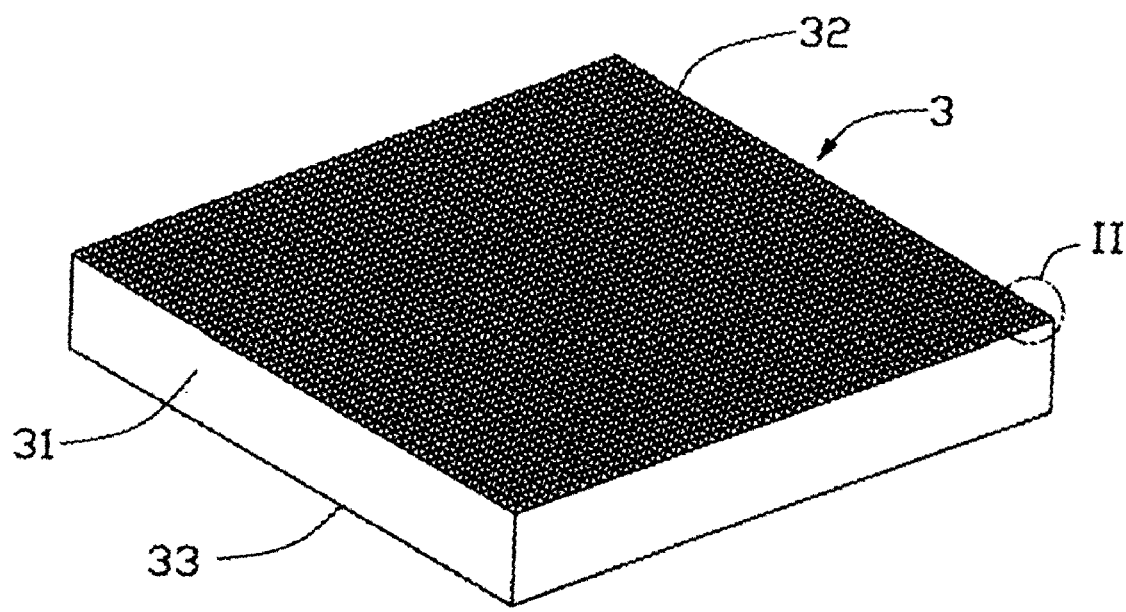
FIG. 1 is an isometric view of a light guide plate in accordance with the preferred embodiment of the present invention.

Referring to FIG. 1, a light guide plate 3 in accordance with a preferred embodiment of the present invention comprises a generally parallelepiped-shaped block having an input surface 31 for receiving light beams from a light source (not shown in FIG. 1), two side surfaces (not labeled) perpendicularly adjoining the incident surface 31, an output surface 32 perpendicularly adjoining the incident surface 31, and a bottom surface 33 opposite to the output surface 32. The block is generally made of a transparent material such as poly(acrylic acid), polycarbonate, polyethylene or glass.

Figure 2:
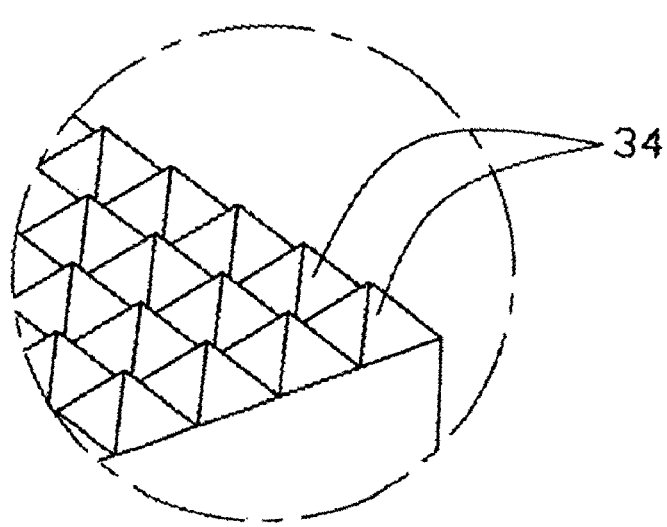
FIG. 2 is an enlarged view of a circled portion II of FIG. 1.

Also referring to FIG. 2, a rectangular array of prisms 34 is integrally formed on the output surface 32 of the block. Each prism 34 is shaped as a square pyramid, in order to focus light beams emitting therefrom. All the prisms 34 have a same size and are arranged contiguously with each other in order to enhance a uniformity of surface illuminance of the block.

Figure 3:
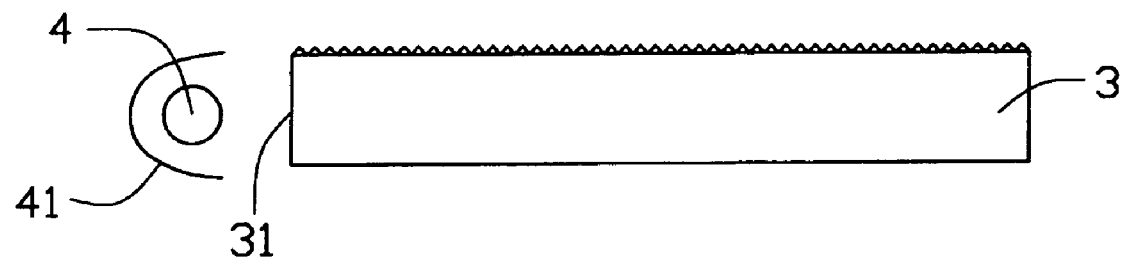
FIG. 3 is a side elevation view of the light guide plate of FIG. 1, together with a lamp and a cover.

Referring to FIG. 3, in practice, a light source including a lamp 4 and a cover 41 is disposed adjacent the incident surface 31 of the light guide plate 3, thereby cooperatively forming a back light module. The back light module further comprises a controlling circuit (not shown). The controlling circuit is for controlling an intensity of light beams emitted from the lamp 4 of the light source according to a detected intensity of light beams emitting from the output surface 32 of the light guide plate 3. The light source can be a point light source or a linear light source. The cover 41 is disposed to surround the lamp 4 in such a way that light beams emitted by the lamp 4 are reflected toward the light guide plate 3. Alternatively, two such light sources can be arranged adjacent opposite sides of the light guide plate 3 respectively, to attain a higher intensity of light beams emitting from the output surface 32 of the light guide plate 3. Preferably, a layer of reflective film is formed on the bottom surface 33 and/or on side surfaces of the block other than the incident surface 31. Alternatively, the layer of reflective film can be substituted by a reflective plate disposed adjacent the bottom surface 33 and/or said side surfaces.

Figure 4:
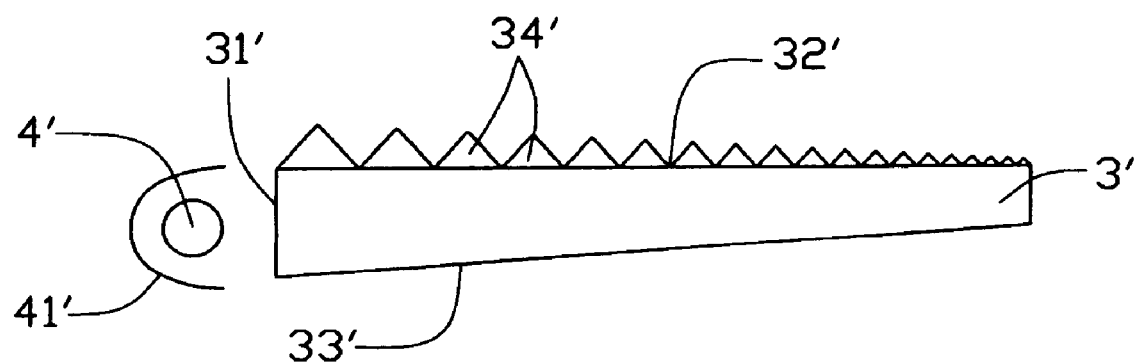
FIG. 4 is similar to FIG. 3, but showing a light guide plate in accordance with the alternative embodiment of the present invention.
Figure 5:
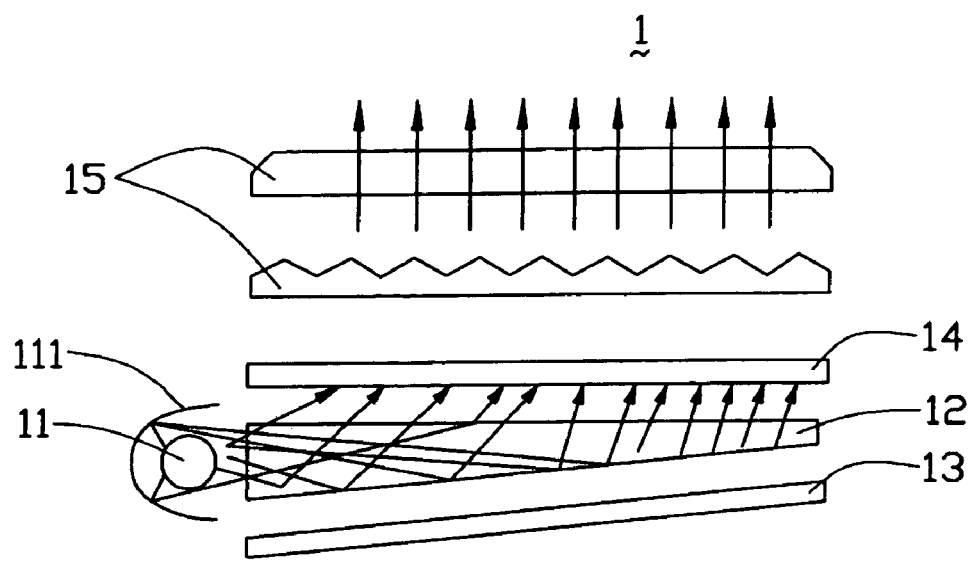
FIG. 5 is a schematic side elevation view of a conventional back light module.
Figure 6:
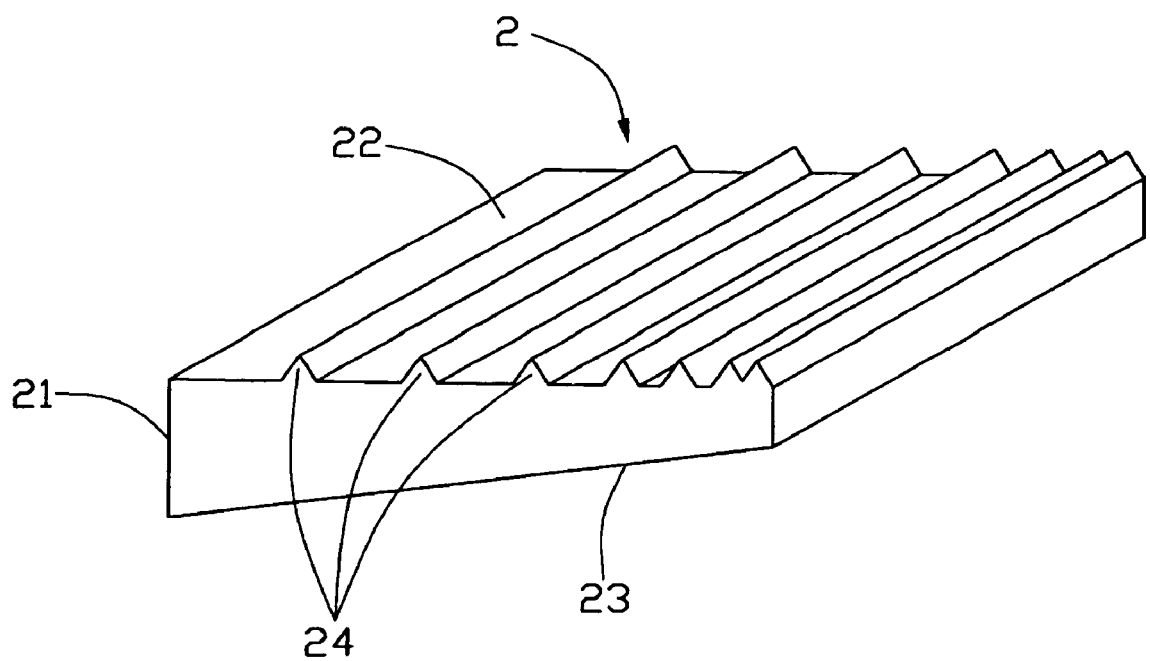
FIG. 6 is an isometric view of a conventional light guide plate.

FIG. 4 shows a light guide plate 3' in accordance with the alternative embodiment of the present invention. A structure of the light guide plate 3' is similar to that of the light guide plate 3 of the preferred embodiment. However, the light guide plate 3' comprises a wedge-shaped block. The block has an input surface 31' located at a thick end of the block for receiving light beam is from a light source that includes a lamp 4' and a cover 41', two side surfaces (not labeled) extending from the thick end to a thin end of the block, an output surface 32' perpendicularly adjoining the incident surface 31' and the side surfaces, and a bottom surface 32' obliquely adjoining the input surface 31' and being opposite to the output surface 32'. A rectangular array of prisms 34' is integrally formed on the output surface 32' of the block. Each prism 34' is shaped as a square pyramid, in order to focus light beams emitting therefrom. The prisms 34' are arranged contiguously with each other, and are horizontally linked to one another without any intervening spaces between neighboring prisms 34'. Heights and sizes of the bases of the prisms 34' gradually decrease from the thick end to the thin end of the block, in order to enhance a uniformity of surface illuminance of the block.

In practice, preferably, a layer of reflective film is formed on the bottom surface 33' and/or on side surfaces of the block other than the input surface 31'. Alternatively, the layer of reflective film can be substituted by a reflective plate disposed adjacent the bottom surface 33' and/or said side surfaces.

While the present invention has been described with reference to particular embodiments, the description is illustrative of the invention and is not to be construed as limiting the invention. Therefore, various modifications of the described embodiments can be made by those skilled in the art without departing from the true spirit and scope of the invention as defined by the appended claims.

What is claimed is:

1. A light guide plate comprising:
    an input surface for receiving light beams from a light source;
    two side surfaces perpendicularly adjoining the input surface;
    an output surface perpendicularly adjoining the input surface and the side surfaces; and
    a bottom surface opposite to the output surface;
    wherein an array of contiguous pyramidal prisms is integrally formed on the output surface, at least a plurality of said pyramidal prisms are differently sized in heights thereof.

2. The light guide plate as recited in claim 1, wherein the bottom surface is coated with a layer of reflective film.

3. The light guide plate as recited in claim 1, wherein the side surfaces are coated with a layer of reflective film.

4. The light guide plate as recited in claim 1, further comprising a reflective plate disposed adjacent the bottom surface of the light guide plate.

5. The light guide plate as recited in claim 1, further comprising reflective plates disposed adjacent the side surfaces of the light guide plate.

6. The light guide plate as recited in claim 1, wherein the different sizing includes variations in sizes of bases of the plurality of said pyramidal prisms.

7. The light guide plate as recited in claim 1, wherein said pyramidal prisms are horizontally linked to one another without any intervening spaces between neighboring pyramidal prisms.

8. A light guide plate comprising:
    a wedge-shaped block having:
    an input surface located at a thicker end of the block, for receiving light beams from a light source;
    two side surfaces extending from the thicker end to a thinner end of the block;
    an output surface perpendicularly adjoining the input surface and the side surfaces; and
    a bottom surface obliquely adjoining the input surface and being opposite to the output surface;
    wherein an array of contiguous pyramidal prisms is integrally formed on the output surface, said pyramidal prisms are differently sized in heights thereof, and sizes of the prisms gradually decrease from the thicker end to the thinner end of the block.

9. The light guide plate as recited in claim 8, wherein the bottom surface is coated with a layer of reflective film.

10. The light guide plate as recited in claim 8, wherein the side surfaces are coated with a layer of reflective film.

11. The light guide plate as recited in claim 8, further comprising a reflective plate disposed adjacent the bottom surface of the block.

12. The light guide plate as recited in claim 8, further comprising reflective plates disposed adjacent the side surfaces of the block.

13. The light guide plate as recited in claim 8, wherein the different sizing includes variations in sizes of bases of the plurality of said pyramidal prisms.

14. The light guide plate as recited in claim 8, wherein said pyramidal prisms are horizontally linked to one another without any intervening spaces between neighboring pyramidal prisms.

* * * * *